3,248,254
CHEMICALLY AND PHYSICALLY UNIFIED
SHEET MATERIALS
Robert E. Zenk, Roseville, and William E. Lundquist, East Oakdale Township, Washington County, Minn., assignors to Minnesota Mining and Manufacturing Company, St. Paul, Minn., a corporation of Delaware
No Drawing. Filed Jan. 31, 1962, Ser. No. 170,233
19 Claims. (Cl. 117—60)

This invention relates to saturated sheet material, particularly to a novel chemically and physically unified saturated cellulosic sheet, and to simple and economical techniques for manufacturing the product. Specific preferred applications for the product of this invention include backings for various coated products, such as pressure-sensitive adhesive tape, coated abrasives, tracing paper, etc.

When an isocyanate group reacts with an alcohol hydroxyl group, the resultant product is termed a urethane; when both the reactants are polyfunctional and the reaction continues, the product is a polyurethane. The reaction between the isocyanate group and the hydroxyl group proceeds at a comparatively high rate of speed if the hydroxyl group is primary, i.e., attached to a carbon atom united to only one other carbon atom; the reaction proceeds at best only slowly and ineffectually if the hydroxyl group is secondary, i.e., attached to a carbon atom united to two other carbon atoms. Isocyanate groups also readily react with water to form a urea along with the evolution of $CO_2$, and, unless the isocyanate-bearing material is especially prepared for "finishing off" with water, it is ordinarily very important to exclude water from the environment in which the isocyanate-bearing material is to be reacted with other materials if consistent results and bubble-free products are to be obtained.

The versatility of polyurethane resins has been recognized for perhaps a quarter of a century, and they have been widely employed as castings, coatings, rubbers, adhesives, varnishes, etc. A limited amount of work has also been done in saturating fibrous sheets with solutions of high molecular weight polyurethane polymers, but the amount which can be dissolved is low, penetration of the sheet has been only moderately successful, and the water-resistance of the finished product has been limited. Although it might appear feasible to saturate paper or cloth with a reactable composition comprising a primary diol, such as a hydroxyl-terminated polyester or a primary polyether glycol like polyethylene glycol, with a polyisocyanate, such as toluene 2,4-diisocyanate, and then react the components to form a high molecular weight polyurethane in situ, the process is fraught with difficulty. The uncontrolled presence of moisture, either in the atmosphere or in the sheet being saturated, results in undesirable and unpredictable side reactions. The pot life of the saturant is short if the reacting molecules are large, and the reaction is hard to control if the molecules are small. If the isocyanate groups are "blocked," or "capped," to retard reaction at room temperature, excessively long times and high temperatures are required to "unblock" them.

Polyether glycols in which the hydroxyl groups are secondary in nature do not normally react effectively with isocyanates. Hence, although polypropylene glycol, which contains only secondary hydroxyl groups, is even less expensive than polyethylene glycol, is liquid instead of solid at comparable molecular weights, and would be expected to have superior water resistance, we do not believe that, prior to our invention, it has been reacted with a polyisocyanate in situ to form a polyurethane saturant for cellulosic sheet material. As a matter of fact, the present commercial practice, tacitly recognizing the difficulties inherent in saturating cellulosic sheets with polyurethane-forming compositions, is to saturate paper with solutions or emulsions of specially tailored long chain rubbery NCO-terminated materials, formed by reacting polytetramethylene glycol with an excess of a difunctional isocyanate, and thereafter chain-extend and crosslink the polymer by reacting the isocyanate groups with water, as by exposing the saturated sheet to high humidity for a week. The isocyanate groups of the saturant are also said to react with the cellulose molmecules; however, even if this does occur, it would be to only a very minor extent at best as the hydroxyl groups of the cellulose, the majority of which are secondary, must compete with the more reactive water for the isocyanate groups.

In accordance with the present invention, there is provided a chemically unified cellulosic sheet material in which the saturant polymer is interbonded with both primary and the more predominant secondary cellulosic hydroxyl groups and the NCO reactive secondary hydroxyl groups of a polyalkylene ether polyol containing predominantly, and preferably entirely, secondary hydroxyl groups. The saturation process may be carried out on conventional equipment. Pot life is excellent; yet final cure may be attained in 48 hours or less, even at room temperature, irrespective of environmental humidity. In a preferred embodiment of the invention, the system is essentially insensitive to water, which is normally present in the atmosphere in which the saturation takes place, in the cellulosic material being staturated, and in any fillers which may be added. The chemical interbonding between the cellulose and the polyalkylene ether glycol is effected with the aid of a catalyst which promotes and carries to substantial completion the normally sluggish and incomplete reaction between secondary hydroxyl groups and isocyanate groups. The resultant unified product is water-resistant, solvent-resistant, heat-resistant and transparent and may be extremely strong and tough. If desired, any of various fillers may be added either to reduce cost or to make the product more suitable for specific applications, all as will be disclosed in greater detail as the description of the invention proceeds.

The liquid composition used to saturate cellulosic sheet material in accordance with this invention thus comprises a polyalkylene ether polyol such as a diol or triol or combination thereof, whose hydroxyl groups are at least predominantly secondary in nature, and at least a stoichiometric amount of a polyisocyanate, the saturation being carried out in the presence of a metal compound which catalyzes the reaction between NCO groups and secondary OH groups. If the only polyol contained in the saturant is a diol, and the only polyisocyanate is a diisocyanate, it is necessary to include a stoichiometric excess of diisocyanate to avoid having an overly soft cured saturated sheet. This excess may range from 20% to 100% or more, and preferably ranged from 35% to 50%. If the only secondary polyol is a triol having a low molecular weight, e.g., 700, satisfactory results may be obtained with as little as 0.8 isocyanate groups per hydroxyl group, but if the molecular weight of the triol is on the order of 2,000 or higher, at least one isocyanate group is required per hydroxyl group. Similarly, if all the secondary polyol present, whether diol, triol, or both, is low molecular weight, and if the isocyanate groups are supplied by a trifunctional isocyanate, 0.8 isocyanate groups per OH group will suffice. The use of low molecular weight polyols increases the rate of cure and results in a somewhat harder and more solvent-resistant finished product.

at 150° F. or by humidifying it and allowing it to stand in roll form overnight.

The saturated sheet of this example was subjected to a series of tests, as indicated in Table 1, below, an identical paper saturated with a butadiene:acrylonitrile rubber serving as the control:

Table 1

| Saturant | Machine Direction, Tensile Strength, Lbs./In. (ASTM Test No. 828) | | | | Elmendorf Tear (ASTM test D-689) | Mullen Burst (ASTM Test D-774) | MIT Flex Test (ASTM D-643) |
| --- | --- | --- | --- | --- | --- | --- | --- |
| | Room Temp. | 300° F. | After 4 Hrs.' Soak in Room Temp. Water | After 4 Hrs.' Soak in Lacquer Thinner | | | |
| Polyurethane | 25.4 | 15.2 | 10.8 | 8.4 | 194 | 56 | 1,913 |
| Butadiene:acrylonitrile | 23.0 | 6.2 | 0.8 | 1.0 | 95 | 46 | 673 |

Since polyisocyanates are more expensive than polyalkylene ether polyols, and since more isocyanate groups are required when the polyol has a low molecular weight, it is economically desirable to employ saturants containing polyols of somewhat higher molecular weight. In addition, the pot life of saturant compositions containing polyols having a molecular weight on the order of 2,000 or more is substantially longer than that of saturant solutions containing only polyols having a molecular weight on the order of 400 to 800. A desirable compromise of the various factors involved is attained by employing a composition containing a major amount of a polyalkylene ether diol having an average molecular weight between 1,000 and 4,000, e.g., 2,000, a minor amount a triol, and an aromatic diisocyanate in an amount sufficient to provide at least one NCO group for each OH group of the polyols, and preferably an excess of about 30%.

Our invention will be further illustrated by the following non-limitative examples in which all parts are by weight unless otherwise specified:

EXAMPLE I

To 100 parts of polypropylene glycol having a molecular weight of approximately 2,000 ("Niax" Diol 2025) was added 33 parts of a secondary hydroxyl-terminated triol, having a molecular weight of approximately 4,400 and formed by reacting 1,2,6-hexane triol with propylene oxide ("Niax" Triol LHT 42), 13.9 parts of toluene 2,4-diisocyanate, 98 parts of xylene, and 2 parts of a polyalkyl polyphenol anti-oxidant. In this formulation, the amount of diisocyanate exceeds by approximately 30% the amount theoretically needed to react with all hydroxyl groups present in the diol and triol. To the above solution was added 3.3 parts of a 5% solution of lead octoate (i.e., the lead salt of 2-ethyl hexanoic acid) in toluene, which catalyzes the reaction between isocyanate groups and secondary hydroxyl groups. The viscosity of the resulting composition was approximately 200 centipoises and it increased gradually to 1500 centipoises over a 24-hour period at room temperature.

A smooth crepe paper having a basis weight of 30 lbs. per papermaker's ream of 500 sheets 24 inches x 36 inches was saturated with the solution described in the preceding paragraph, approximately 100% solid saturant being applied on the basis of the paper. The solvent was evaporated by passing the saturated sheet through a 275° F. forced air oven for 3 minutes, after which the treated paper was wound in roll form. Immediately after treating, the paper had a somewhat greasy feel, but after standing 48 hours at room temperature it was found to be free from this characteristic. Similar but expedited results are obtained either by heating the saturated paper for 16 hours A pressure-sensitive adhesive tape was formed from the saturated paper described in the preceding paragraph by backsizing it with a butylated urea aldehyde as disclosed in Kellgren U.S. Patent 2,548,980, face sizing it with a neoprene-phenolic resin containing magnesium and zinc oxides as curing agents, and then coating the face with a solution of conventional rubber:resin adhesive and allowing the solvent to evaporate. The tape product of this example was transparent and thus could be substituted for acetate fiber tape, which finds wide use in holding and package sealing operations. The high degree of solvent posure to 100% relative humidity at 120° F. Tape applications for masking parts, e.g., refrigerator or automobile bodies, which are to be sprayed with lacquer and the tape subsequently stripped off. The physical qualities of the tape remained excellent after four weeks of exposure to 10% relative humidity at 120° F. Tape applied to steel panels could also be removed without adhesive transfer at 10° F. In preparing tape from the saturated paper of this example, it is desirable to select normally tacky and pressure-sensitive adhesives having resinous components which will not migrate into the backing and thus cause loss of tack. Suitable adhesives include rubber:resin blends of the type disclosed in Drew U.S. Patent 2,410,053. Where resin migration is troublesome, however, it may be minimized by including additional resin in either the tape backing or the adhesive itself.

In order to assess the degree of reaction between the toluene diisocyanate employed in this example and the cellulosic hydroxyl groups in the paper sheet being saturated, the following test was performed:

Thirty-pound crepe paper samples were refluxed in dried toluene for two hours at about 120° C., and thereafter placed in weighing bottles and dried under infra red lamps in a desiccator containing phosphorous pentoxide. The bottles were then filled with 25% solids solutions of various isocyanates in dried toluene, as indicated below, for a period of ten minutes, after which the excess isocyanate was poured off and the bottles returned to the desiccator. All samples were then dried in the desiccator under infra red lamps at a reduced pressure for a period of 96 hours and reweighed. The amount of unreacted isocyanate was then determined by adding excess amine and back-titrating with HCl, according to the Society of the Plastics Industries' proposed standard method for chemical analysis of urethane foam raw materials, as published in du Pont Booklet HR-18 dated December 15, 1956.

The difference between the amount of isocyanate put into the paper and the amount found is the amount which reacted with the paper. Results of these experiments are indicated in Table 2 below:

Table 2

| Isocyanate | Amount of isocyanate applied to paper, milli-equivalents | Milli-equivalents of isocyanate detected | Milli-equivalents of isocyanate reacted with paper |
|---|---|---|---|
| o-Methoxy isocyanate | 0.04 | 0 | 0.04 |
| o-Methoxy isocyanate plus lead octoate | 1.18 | 0 | 1.18 |
| Phenyl isocyanate | 0.07 | 0 | 0.07 |
| Phenyl isocyanate plus lead octoate | 2.38 | 0 | 2.38 |
| Toluene 2,4-diisocyanate plus lead octoate | 9.53 | 3.25 | 6.28 |
| Isocyanate-terminated rubbery reaction product of polytetramethylene glycol and an excess of toluene 2,4-diisocyanate ("Adiprene L-100"), 60% solution [1] | 1.35 | 1.32 | 0.03 |
| "Adiprene L-100" plus lead octoate [1] | 1.24 | 0.16 | 1.08 |

[1] Paper dipped in solution, blotted dry, and replaced in weighing bottle.

From the preceding table it is inferred that a definite reaction with the cellulose hydroxyl groups, most of which are secondary, occurs when the lead octoate is present, but not otherwise. It may also be inferred that litle or no reaction normally occurs between "Adiprene L-100" and cellulose.

EXAMPLE II

To 100 parts of "Niax" Diol 2025, defined in Example I, was added 11.3 parts of toluene 2,4-diisocyanate, 65 parts of xylol, and 2 parts of polyakyl polyphenol antioxidant. To the solution was now added 2.2 parts of a 5% solution of lead octoate, the viscosity of the resulting composition being approximately 200 centipoises and the pot life exceeded 24 hours at room temperature. When this material was used to satuarte the same paper employed in Example I and the saturated sheet then cured ½ hour at 250° F., it was found that the tensile strength in the machine direction was approximately 21.5 lbs. per inch of width. The same superior heat resistance, water resistance, solvent resistance, etc., were found.

In this formulation, as in that of Example I, the amount of diisocyanate exceeds by approximately 30% the amount theoretically required to react with all hydroxyl groups present in the diol; it will be noted, however, that no triol is present. Although the saturant employed in Example I, which contains a trifunctional ingredient, functions quite effectively if only a stoichiometric amount of diisocyanate is present (although the pot life is decreased), the composition employed in this Example II requires an excess of isocyanate if the optimum results are to be attained. In compositions containing only difunctional reactants, as in Example II, it has been found important to supply at least 20%, and preferably 30 to 50%, excess isocyanate groups. If substantially less than a 20% excess is present, the resultant product is soft and not particularly useful as a saturant for a pressure-sensitive adhesive tape backing. Although costly, the composition may contain as much as 100% excess isocyanate; the only noticeable effects which occur from the use of such excess are that the pot life of the composition is increased and the saturated paper product tends to be somewhat easier to tear. In certain applications this may be desirable, but, as will be shown in subsequent examples, a sheet which can be torn readily may be prepared in more economical ways. Among these is increasing the number of mols of trifunctional component present, e.g., by using additional polyalkylene ether triol, substituting a primary triol (e.g., trimethylol propane), a mixed triol (e.g., glycerine), a short-chain secondary triol (e.g., the reaction product of one mol of trimethylol propane with three mols of propylene oxide), adding a triisocyanate, or by adding combinations of these ingredients.

EXAMPLE III

To 100 parts of polypropylene glycol having a molecular weight of 400 ("Niax" Diol 425) was added 1.5 parts of a polypropylene ether triol, having a molecular weight of approximately 700 ("Niax" Triol LHT 240). To the mixture of secondary polyalkylene ether polyols was now added 47.3 parts of toluene 2,4-diisocyanate. No solvent was added, and the viscosity was about 300 centipoises, and, because no catalyst was present, the composition had a pot life of several hours. Had catalyst been added, pot life would have been only a few minutes.

A smooth crepe paper of the same type employed in Example I, was now "catalyzed" by applying a 0.05% soltuion of lead octoate in xylene and evaporating the solvent. (The lead octoate may alternatively be applied from emulsion.) The thus "catalyzed" paper was then dried by passing it through a forced air oven. The paper could be stored for several weeks without significant change. The catalyzed paper was now saturated with the composition described in the preceding paragraph, an amount approximately equal to the weight of the paper being applied. The satuarted paper was cured by heating 3 minutes at 275° F., after which it was found to have a machine direction tensile strength of 28.0 lbs. per inch of width. The Elmendorf tear test value was approximately 62, which is significantly lower than that of the product of Example I. It is presumed that the relative ease of tear is attributable to the comparatively low molecular weigh of the starting polyol materials. Saturated paper of this type is useful as a masking tape backing.

EXAMPLE IV

To 800 grams of "Niax" Diol 2025 was added 267 grams of "Niax" Triol LHT 42, 1430 grams of xylene, 111.2 grams of toluene 2,4-diisocyanate, 1067 grams of calcined clay, 2.4 grams of phenyl mercuric acetate, and 26.7 grams of 5% lead octoate solution, and the composition used to saturate a 4-mil rope paper. Solvent was evaporated and the saturated paper cured overnight at 150° F.

The addition of filler still further reduces the cost of the saturant material and, in the instant case, imparts opacity to the sauraed paper. Despite the filler, this product was strong and tough and was well-suited for use as a backing for printable tapes. If fillers having a refractive index similar to that of the polyurethane are employed, transparency is maintained, and in the case of fillers like calcium carbonate, a tracing paper can be obtained by saturating the desired paper. Crepe paper saturated with up to two parts of filler per part of reactant in the composition is useful where it is desirable to increase ease of tear while still maintaining a high degree of solvent resistance, heat resistance, and water resistance. Phenyl mercuric compounds, such as oleate or the acetate used in this example, or mercuric octoate, make it unnecessary to remove the ordinarily deleterious small amounts of water which are present. Unless special precautions are taken, the lead octoate and bismuth naphthenate described in other examples are ineffective to produce the desired degree of cure when the filler employed in the composition just described is present. In order to use clay filler with a lead octoate catalyst alone, for example, it has been found necessary to remove residual traces of water by means of a refluxing operation carried out in a polyol-clay-toluene mixture. We do not regard as part of our invention the catalysts per se; but we believe that we are the first to employ them in the manner described in these examples.

EXAMPLE V

A saturating composition was prepared by blending 100 parts of a polyether triol having a molecular weight of about 6,000 ("Niax" Triol LHT 28), 5.95 parts of toluene 2,4-diisocyanate, 60 parts of xylene, and 5 parts of a solution of bismuth naphthenate containing 6% bismuth by weight. Four-mil rope paper was saturated with an equal weight of this composition, the solvent evaporated in a forced air oven, and the saturated paper allowed to remain at room conditions for 48 hours. Handling characteristics were good, and the tensile strength was 60 lbs. per inch of width. When provided with a normally tacky and pressure-sensitive adhesive coating, the product was useful as a produce bundling tape.

EXAMPLE VI

A saturating composition was prepared by blending 100 parts of polypropylene glycol having a molecular weight of about 4,000 ("Niax" Diol 4025), 15.35 parts of "Mondur CB-75" (a 75% ethyl acetate solution of the reaction product of one mol of trimethylol-propane and three moles of toluene diisocyanate), 60 parts of xylene, and 3.3 parts of 5% lead octoate solution. Thirty-pound crepe paper saturated with this composition was found to have a tensile strength of about 20.5 pounds per inch of width and an Elmendorf tear value of 99. This product was well suited to the manufacture of a holding tape.

EXAMPLE VII

A saturating composition was prepared by blending 400 parts of difunctional polypropylene glycol having a molecular weight of 1,000 ("Niax" Diol 1025), 400 parts of difunctional polypropylene glycol having a molecular weight of 2,000 ("Niax" Diol 2025), 400 parts of a polyether triol having a molecular weight of 4,400 ("Niax" Triol LHT 42), 400 parts of a polyether triol having a molecular weight of 3,000 ("Niax" Triol LG 56), 400 parts of a polyether triol having a molecular weight of 1500 ("Niax" Triol LHT 112), 280 parts of toluene 2,4-diisocyanate, 97 parts of TiO₂, 2 parts of Sherwood green pigment, 1 part of carbon black, 1,000 parts of xylene, and 15 parts of a 20% solution of lead octoate in xylene. A kraft saturating paper having a caliper of 3.8 mils and weighing 28 lbs. per papermaker's ream was saturated with the composition just described, approximately 23 lbs. of saturant (dry weight) being applied per ream. The saturated paper was then dried and partially cured by passing it through a hot air tunnel for a period of 4 minutes, the air temperature being 250° F. and air velocity about 500 feet per minute. The web was then passed through a low pressure (10 p.s.i. gauge) steam box to humidify it slightly and wound into a roll.

A presize of butadiene:acrylonitrile latex, of the type conventionally used in the manufacture of waterproof sandpaper, was then applied to one side of the partially saturated paper, 5.1 lbs. (dry weight) being applied per ream. The paper was then cured for 48 hours at 75° F. and 50% relative humidity. It was found that it now had a caliper of 4.0 mils and a dry tensile strength of 27.5 lbs. per inch of width. After soaking in water for four minutes, the tensile strength was found to be 18.0 lbs. per inch of width. The Elmendorf tear value was 72, a figure which increased to 148 after soaking in water.

The saturated and presized paper was then coated on the presized side with a conventional alkyd sandpaper making varnish, Grade 240 silicon carbide mineral applied, and the making coat cured 20 hours at 210° F. The product was thereafter sandsized with a conventional alkyd sandsizing resin and again heated 20 hours at 210° F. The resultant coated abrasive product was extremely effective in sanding surfaces of the type ordinarily applied to automobile bodies prior to lacquering. Resistance to wrinkling and breakup was at least as good as the best commercially available coated abrasive waterproof material known at the present time. Tear resistance was outstanding.

EXAMPLE VIII

A saturating composition was formed by blending 100 parts of a secondary polyether triol having a molecular weight of about 400 ("Niax" Triol LK-380), 100 parts of xylene, 71 parts of toluene 2,4-diisocyanate, and 2.5 parts of a 5% xylene solution of lead octoate. Stretched jeans-cloth, weighing 42 grains per 24 square inches, was saturated with an approximately equal amount by weight of the composition just described. The saturated cloth was then placed in a dry oven at 250° F. for 15 minutes. The oven was then filled with steam for 10 minutes, after which the cloth was removed, wound into a roll, and conditioned at 70° F., 15% relative humidity, for 25 hours. Tensile strength in both machine and cross directions exceeded that of the conventional starch- and glue-filled backing. Stretch at 50 and 100 lbs. tension per inch of width was at least 10% lower than that of the conventional material. The tensile strength at break was approximately the same in each case. Both products had a high degree of flexibility and a desirable "hand."

This cloth was then coated in a conventional manner with a phenol-formaldehyde make coat, Grade 120 aluminum oxide mineral, and a phenol-formaldehyde sand-size. After curing, the resultant coated abrasive sheet was used to sand ½-inch x ½-inch steel bars under a pressure of 40 lbs. per square inch. The coated abrasive product of this example removed more steel and lost less weight than a control product which was substantially identical in every way except that the backing was conventionally filled with starch and glue.

It will be readily apparent from the foregoing specification that our invention is not to be construed as limited to the specific embodiments disclosed. For example, suitable polyisocyanates include, besides those specifically enumerated, toluene 2,6-diisocyanate,

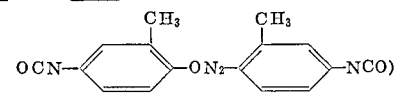

and such trifunctional triisocyanates as 4,4',4''-triisocyanatotriphenyl methane or polyphenyl polyisocyanate. Likewise, although polypropylene ether polyols represent a readily available and inexpensive source of secondary hydroxyl group-bearing materials, polybutylene ether polyols such as polybutylene glycol can be successfully employed. Even higher polyalkylene ether polyol homologs may be used, but their present cost reduces their attractiveness. Similarly polyols and polyisocyanates used to introduce three-dimensionality and hardness may contain more than three functional groups.

What we claim is:

1. A chemically and physically unified and interbonded sheet material comprising a fibrous cellulosic sheet saturated and reacted with the in situ-cured polyurethane reaction product of a secondary hydroxyl-terminated polyalkylene ether polyol and a polyisocyanate present in sufficient amount to provide at least about one NCO group for each OH group of said polyether, said reaction being carried out in the presence of a catalytic amount of a compound selected from the class consisting of lead octoate, bismuth naphthenate, phenyl mercuric acetate, and phenyl mercuric oleate.

2. A polyurethane saturated cellulosic sheet material wherein the saturant is chemically interbonded with the cellulose of the sheet material, formed by interreacting the hydroxyl groups of the cellulose and the hydroxyl groups of a secondary hydroxyl-terminated polyether polyol having a molecular weight of from about 400 to about 6,000, with a polyisocyanate in the presence of a polyvalent metal organic compound which catalyzes the finishing off reaction of secondary hydroxyl groups and isocyanate groups at room temperature, the polyisocyanate being present in sufficient amount to provide at least one NCO group for each OH group of said polyether.

3. A chemically unified and interbonded sheet material comprising a cellulosic sheet having distributed throughout and chemically interbonded therewith a polyurethane formed in situ by the interreaction of the OH groups of the cellulose and the OH groups of a secondary OH-terminated polyalkylene ether glycol with the NCO groups of a diisocyanate in the presence of a polyvalent metal organic compound which catalyzes the reaction of secondary hydroxyl groups with isocyanate groups at room temperature, the diisocyanate being present in an amount sufficient to provide more than one NCO group for each OH group of the glycol.

4. The product of claim 3 in which the diisocyanate is present in an amount sufficient to provide between 1.2 and 2.0 NCO groups for each OH group of the glycol.

5. The product of claim 3 in which the diisocyanate is present in an amount sufficient to provide between 1.35 and 1.50 NCO groups for each OH group of the glycol.

6. A chemically and physically unified and interbonded sheet material comprising a fibrous cellulosic sheet saturated and reacted with the in situ-cured polyurethane reaction product of a secondary hydroxyl-terminated polyether triol and a diisocyanate which is present in sufficient amount to provide at least about one NCO group for each OH group of said triol, said reaction being carried out in the presence of a polyvalent metal organic compound which catalyzes the normally sluggish reaction between secondary hydroxyl groups and isocyanate groups. amount of a trifunctional material whose terminal groups 7. A chemically and physically unified and interbonded sheet material comprising a fibrous cellulosic sheet saturated and reacted with the in situ-cured polyurethane reaction product of a saturant composition consisting essentially of ingredients comprising a polyisocyanate, a secondary hydroxyl-terminated polyether glycol, a minor amount of a trifunctional material whose terminal groups are reactive with the terminal groups of another of the previously named ingredients, the total number of NCO groups being at least equivalent to the total number of hydroxyl groups in the saturant prior to cure, and a catalytically effective amount of a compound selected from the class consisting of lead octoate, bismuth naphthenate, phenyl mercuric acetate, and phenyl mercuric oleate.

8. The sheet material of claim 7 wherein the trifunctional material is a triisocyanate.

9. The sheet material of claim 7 wherein the trifunctional material is a triol.

10. The sheet material of claim 9 wherein the total number of NCO groups exceeds the total number of hydroxyl groups in the saturant prior to cure.

11. The sheet material of claim 9 wherein the total number of NCO groups is from 120% to 200% of the total number of OH groups in the saturant prior to cure.

12. The sheet material of claim 9 wherein the total number of NCO groups is from 135% to 150% of the total number of OH groups in the saturant prior to cure.

13. A coated sheet material comprising a coating firmly adherently bonded over a chemically and physically unified and interbonded sheet material comprising a fibrous cellulosic sheet saturated and reacted with the in situ-cured polyurethane reaction product of a secondary hydroxyl-terminated polyether polyol and at least a stoichiometric amount of polyisocyanate, said reaction being carried out in the presence of a polyvalent metal organic compound which catalyzes the normally sluggish reaction between secondary hydroxyl groups and isocyanate groups at room temperature.

14. A pressure-sensitive adhesive tape comprising a normally tacky and pressure-sensitive adhesive firmly adherently bonded to a chemically and physically unified and interbonded sheet material comprising a fibrous cellulosic sheet saturated and reacted with the in situ-cured polyurethane reaction product of a secondary hydroxyl-terminated polyether polyol and a polyisocyanate present in sufficient amounts to provide at least about one NCO group for each OH group of said polyether, said reaction being carried out in the presence of a compound which catalyzes the normally sluggish reaction between secondary hydroxyl groups and isocyanate groups, said compound being selected from the class consisting of lead octoate, bismuth naphthenate, phenyl mercuric acetate, and phenyl mercuric oleate.

15. A pressure-sensitive adhesive tape comprising a normally tacky and pressure-sensitive adhesive firmly adherently bonded to a chemically and physically unified and interbonded sheet material comprising a paper sheet saturated and reacted with the in situ-cured polyurethane reaction product of polyols of which a major amount is polypropylene diol and a minor amount is a polyalkylene ether triol, and an amount of diisocyanate sufficient to provide a stoichiometric excess of NCO groups to react with the OH groups of said polyols, said reaction being carried out in the presence of a polyvalent metal organic compound which catalyzes the normally sluggish reaction between secondary hydroxyl groups and isocyanate groups.

16. A pressure-sensitive masking tape which is strong, solvent-resistant, heat-resistant, water-resistant, and readily torn when desired, which tape comprises a normally tacky and pressure-sensitive adhesive firmly adherently bonded to a chemically and physically unified and interbonded sheet material comprising a crepe paper sheet saturated and reacted with the in situ-cured solid reaction product of an initially liquid saturant composition comprising polyols of which a major amount is polypropylene glycol having a molecular weight in the range of 1,000 to 4,000, and a minor amount is a polypropylene ether triol, a comminuted opacifying filler material, an amount of aromatic diisocyanate sufficient to provide a stoichiometric excess of NCO groups to react with the OH groups of the diol and triol, and a polyvalent metal organic compound which catalyzes the normally sluggish reaction between secondary hydroxyl groups and isocyanate groups.

17. The method of producing a chemically unified and interbonded sheet material including the steps of: providing a liquid saturating composition comprising a secondary hydroxyl-terminated polyol and a polyisocyanate normally ineffectually reactive with said polyol, the ratio of NCO groups provided by said polyisocyanate to OH groups provided by said polyol being at least about 1:1, saturating a fibrous cellulosic sheet with said composition, and in the presence of a compound which catalyzes the reaction between isocyanate groups and secondary hydroxyl groups, said compound being selected from the class consisting of lead octoate, bismuth naphthenate, phenyl mercuric acetate, and phenyl mercuric oleate, interreacting the cellulose, the polyol, and the polyisocyanate.

18. The method of claim 17 in which the compound which catalyzes the reaction between isocyanate groups and secondary hydroxyl groups is included in the liquid saturating composition.

19. The method of claim 17 in which the sheet material is impregnated with the compound which catalyzes the reaction between isocyanate groups and secondary hydroxyl groups before the liquid saturating composition is introduced into the sheet material.

(References on following page)

References Cited by the Examiner

UNITED STATES PATENTS

| | | | |
|---|---|---|---|
| 2,410,053 | 10/1946 | Drew | 260—3 |
| 2,430,479 | 11/1947 | Pratt et al. | 117—60 |
| 2,548,980 | 4/1951 | Kellgren | 117—68.5 |
| 2,901,467 | 8/1959 | Croco | 117—161 |
| 2,967,117 | 1/1961 | Arledter et al. | 117—155 |
| 2,981,719 | 4/1961 | Muhlhausen et al. | 260—75 |
| 3,012,987 | 12/1961 | Ansul | 117—161 |
| 3,027,276 | 3/1962 | Cohen et al. | 117—161 |
| 3,058,955 | 10/1962 | Neumann et al. | 260—75 |
| 3,068,117 | 12/1962 | Korpman. | |
| 3,083,118 | 3/1963 | Bridgeford | 117—62.2 |

FOREIGN PATENTS

| | | |
|---|---|---|
| 243,246 | 1/1960 | Australia. |
| 768,075 | 2/1957 | Great Britain. |

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,248,254                              April 26, 1966

Robert E. Zenk et al.

It is hereby certified that error appears in the above numbered patent requiring correction and that the said Letters Patent should read as corrected below.

Column 2, line 3, after "has" insert -- ever --; line 16, for "molmecules" read -- molecules --; line 61, for "ranged" read -- ranges --; columns 3 and 4, Table 1, eighth column, in the heading thereof, after "ASTM" insert -- Test --; column 4, line 35, for "posure to 100% relative humidity at 120° F. Tape" read -- resistance in this tape makes it particularly useful in --; line 40, for "10%" read -- 100% --; column 5, line 27, for "litle" read -- little --; line 40, for "satuarte" read -- saturate --; column 6, line 17, for "soltuion" read -- solution --; line 25, for "satuarted" read -- saturated --; line 32, for "weigh" read -- weight --; line 47, for "sauraed" read -- saturated --; column 9, line 37, strike out "amount of a trifunctional material whose terminal groups".

Signed and sealed this 1st day of August 1967.

(SEAL)
Attest:

EDWARD M. FLETCHER, JR.                         EDWARD J. BRENNER
Attesting Officer                                 Commissioner of Patents